United States Patent
Kim

(10) Patent No.: US 8,116,790 B2
(45) Date of Patent: Feb. 14, 2012

(54) REPLY MESSAGE OF A MOBILE TERMINAL

(75) Inventor: Inbok Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 747 days.

(21) Appl. No.: 11/753,489

(22) Filed: May 24, 2007

(65) Prior Publication Data

US 2007/0275744 A1  Nov. 29, 2007

(30) Foreign Application Priority Data

May 26, 2006 (KR) .................. 10-2006-0047840

(51) Int. Cl.
  *H04W 4/00* (2009.01)
  *G01R 31/08* (2006.01)

(52) U.S. Cl. ..................... 455/466; 370/232

(58) Field of Classification Search ............... 455/466; 379/100.17, 100.13, 13.88, 88.17; 709/231, 709/203; 370/232, 466

See application file for complete search history.

(56) References Cited

U.S. PATENT DOCUMENTS

| 7,010,790 B2* | 3/2006 | Marsot et al. ............ 718/105 |
| 7,061,863 B2* | 6/2006 | Watanabe et al. ........ 370/232 |
| 2003/0154300 A1* | 8/2003 | Mostafa ................. 709/231 |
| 2006/0282738 A1* | 12/2006 | Sohn et al. ............... 714/748 |
| 2007/0037557 A1* | 2/2007 | Shao et al. ............. 455/414.1 |
| 2007/0171938 A1* | 7/2007 | Sohn et al. .............. 370/466 |
| 2009/0270115 A1* | 10/2009 | Brun et al. .............. 455/466 |

FOREIGN PATENT DOCUMENTS

| KR | 10-2004-0033151 | 4/2004 |
| KR | 10-2005-0008239 | 1/2005 |
| KR | 10-2006-0030416 | 4/2006 |
| KR | 10-2006-0066238 | 6/2006 |

* cited by examiner

*Primary Examiner* — Lester Kincaid
*Assistant Examiner* — Kuo Woo
(74) *Attorney, Agent, or Firm* — Lee, Hong, Degerman, Kang & Waimey

(57) ABSTRACT

A method of acknowledging receipt of a mobile terminal and a mobile terminal for performing the same is provided. The method includes receiving a multimedia message, reproducing multimedia contents related to the multimedia message, and sending a reply message indicating whether a complete multimedia message was reproduced, the determination of whether the complete multimedia message was reproduced based on the reproduction time information in the multimedia message.

12 Claims, 4 Drawing Sheets

REPLY MESSAGE OF A MOBILE TERMINAL

CROSS-REFERENCE TO RELATED APPLICATION

Pursuant to 35 U.S.C. §119(a), this application claims the benefit of earlier filing date and right of priority to Korean Patent Application No. 10-2006-0047840, filed on May 26, 2006, the entire contents of which is incorporated by reference herein in its entirety.

FIELD OF THE INVENTION

This invention is directed to a method of acknowledging receipt of a multimedia message in a mobile terminal and a mobile terminal for performing the same.

DISCUSSION OF RELATED ART

The Multimedia Messaging Service (MMS) refers to a messaging service in which various formats of data are processed, converted and selected such that they are suitable for a variety of multimedia service environments, and for enabling transmission and reception of multimedia information.

The MMS includes a message reception confirmation function. After the message reception confirmation function is set in a calling-side mobile terminal, if a multimedia message is sent to a receiving-side mobile terminal and a user of the received-side mobile terminal reads the multimedia message, the received-side mobile terminal sends a "read-reply" to the calling-side mobile terminal. The "read-reply" is a reply message indicating that the user has read the message.

In this case, even after the recipient plays or displays the received multimedia message, the received-side mobile terminal sends "read-reply" to the calling-side mobile terminal. Accordingly, the user of the calling-side mobile terminal does not know whether the received-side user has confirmed all the contents of the multimedia message.

SUMMARY OF THE INVENTION

An object of the present invention is to provide a method of sending a reply message of a mobile terminal and a mobile terminal for the same.

In one aspect of the present invention, a method of acknowledging receipt of a multimedia messaging service (MMS) message in a mobile terminal is provided, the method includes: receiving a multimedia message; reproducing multimedia contents related to the multimedia message; and sending a reply message indicating whether a complete multimedia message was reproduced, wherein the multimedia message comprises reproduction time information.

It is contemplated that a plurality of slides forming the multimedia message are reproduced. It is further contemplated that determining whether a complete multimedia message was reproduced includes: determining the elapsed play time of the multimedia contents; and comparing the elapsed play time with the received multimedia message reproduction time information.

It is contemplated that sending the reply message further comprises indicating a percentage of the complete multimedia content that was reproduced, if reproduction of the multimedia content was stopped before completion of a predetermined message content play time. It is further contemplated that a reproduction time is defined for each slide forming the multimedia contents.

It is contemplated that reproducing the multimedia contents includes: determining if a multimedia message header includes a field indicating to send a reply message indicating the received message was reproduced; and extracting from a multimedia message data body a file describing a reproduction method for each slide forming the multimedia contents, if the multimedia message header field exist, wherein the file includes the reproduction time information. It is further contemplated that the file is a Synchronized Multimedia Integration Language (SMIL) file. It is further contemplated that the contents comprise at least one of text, audio, video, image and moving picture contents.

It is contemplated that the reply message comprises a field indicating whether the received multimedia contents were reproduced in accordance with the reproduction time information.

In another aspect of the present invention, a mobile terminal for acknowledging receipt of multimedia message reply message, includes: a wireless transceiver for receiving a multimedia message; an input device for inputting a reproduction instruction for the multimedia message; and a controller for reproducing the multimedia contents related to the multimedia message according to the reproduction instruction of the input device, generating a reply message indicating whether the entire multimedia contents were reproduced, and sending the generated reply message through the wireless transceiver.

It is contemplated that the multimedia message includes reproduction time information. It is further contemplated that the controller generates the reply message comprising information indicating a percentage of the whole multimedia contents that were reproduced, if reproduction of the multimedia contents was stopped before a predetermined reproduction time expired.

It is further contemplated that the reply message includes a field for indicating whether the received multimedia contents were reproduced in accordance with the reproduction time information.

It is contemplated that the mobile terminal further includes: a display for displaying a reproduction screen of the contents under the control of the controller, if there is a reproduction instruction received through the input device. It is further contemplated that the reproduction time information is defined for each slide forming the multimedia contents.

It is contemplated that the format of the multimedia message includes: a header; and a body comprising at least one of data contents and a file describing a reproducing method for each of the multimedia contents, wherein the file includes a tag defining the reproduction time information. It is further contemplated that the file is a Synchronized Multimedia Integration Language (SMIL) file.

DETAILED DESCRIPTION OF THE INVENTION

The present invention will now be described in detail in connection with specific embodiments with reference to the accompanying drawings.

Figure 1:
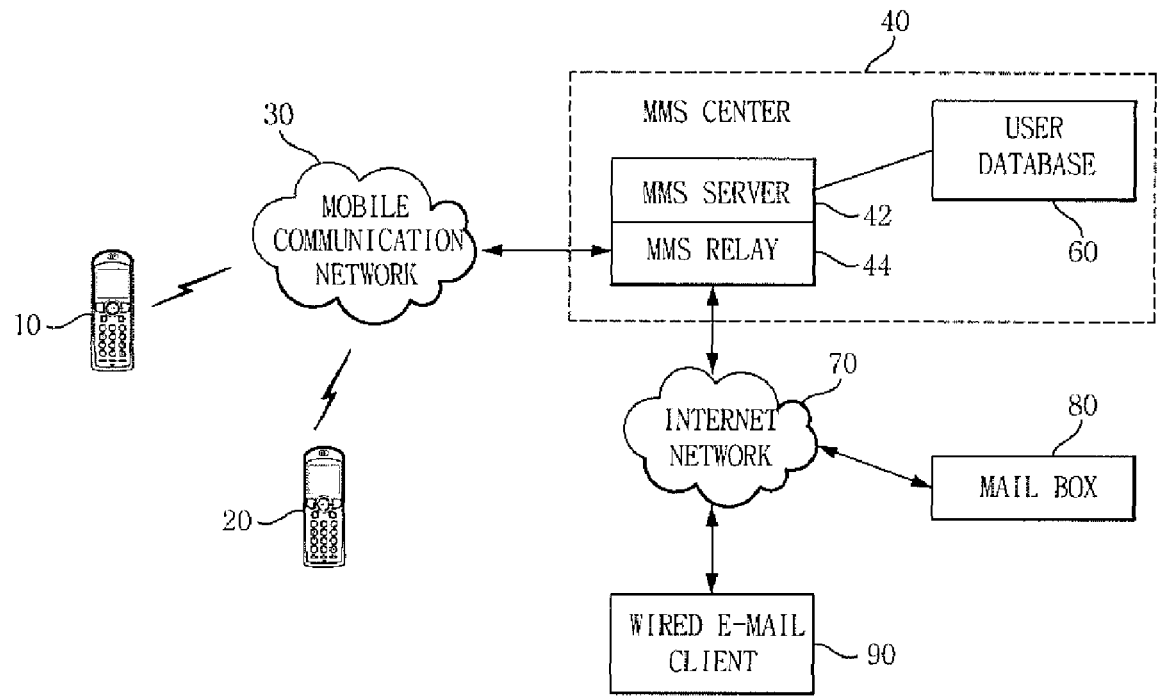
FIG. 1 illustrates the configuration of a multimedia messaging service system to which a method of acknowledging receipt of a message in a mobile terminal according to the preset is applied.

FIG. 1 illustrates the configuration of a multimedia messaging service system (MMS) to which a method of acknowledging receipt of a message in a mobile terminal according to an embodiment of the present invention is applied.

Referring to FIG. 1, the MMS system includes mobile terminals 10 and 20, and a mobile network 30 for allowing the mobile terminals 10 and 20 to communicate with a MMS center 40.

A mobile terminal, as described herein, may include any of a cellular phone, a Personal Communication Systems (PCS), a Personal Data Assistant (PDA), an International Mobile Communication-2000 (IMT 2000) terminal, and other related devices in the following description.

The mobile communication network 30 can be a Global System for Mobile communication (GSM) network, a Universal Mobile Telecommunications System (UMTS) network, or a General Packet Radio Service (GPRS) network.

The MMS system further includes an external server, such as a mail box 80, and an Internet network 70 connected to a wired e-mail client 90. The mail box 80 is connected to the Internet network 70, and stores messages in an e-mail system. The wired e-mail client 90 is connected to the Internet network 70, and transmits e-mails on a wired line.

The MMS center 40 includes a MMS server 42, a MMS relay 44 and a user database 60. The MMS server 42 is responsible for processing and storing transmitted/received MMS messages. The MMS relay 44 performs message transfer between different message systems. The user database 60 stores user-related information, such as user subscription information and address information.

Figure 2:
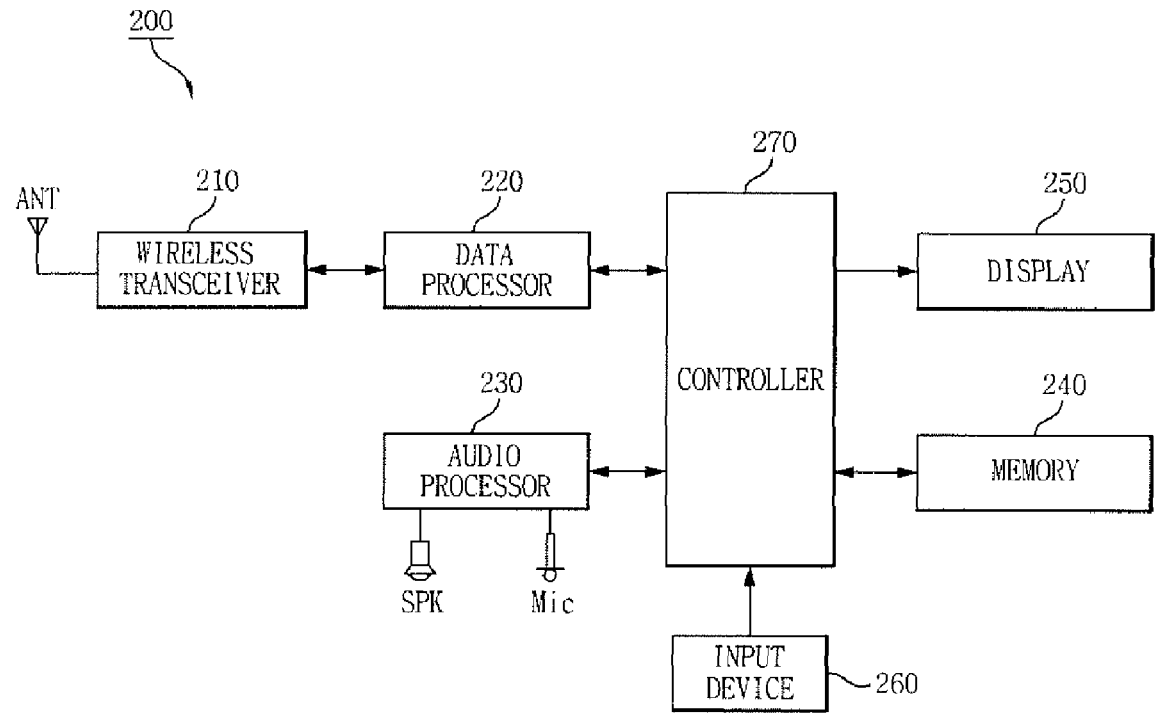
FIG. 2 is a block diagram illustrating the construction of a mobile terminal, according to an embodiment of the present invention.

FIG. 2 is a block diagram illustrating the construction of a mobile terminal, according to an embodiment of the present invention.

Referring to FIG. 2, the mobile terminal 200 according to the present embodiment includes a wireless transceiver 210, a data processor 220, an audio processor 230, a memory 240, a display 250, an input device 260, and a controller 270.

The wireless transceiver 210 performs a communication function of the mobile terminal 200. In this configuration, the wireless transceiver 210 receives a multimedia message from the MMS center 40, and sends the message to the controller 270.

The data processor 220 encodes and modulates a transmitted signal, and demodulates and decodes a received signal. In the present embodiment, the data processor 220 decodes audio contents, video contents, and motion image contents, which may be included in a received multimedia message, and sends the result to the audio processor 230 or the display 250, under the control of the controller 270.

The audio processor 230 serves to play a received audio signal, which is decoded in and output from the data processor 220, or send an audio signal, which is generated from a microphone MIC, to the data processor 220.

The memory 240 includes program memory and data memory. The program memory stores programs for controlling general operations of the mobile terminal 200. Herein, the memory 240 stores a software program for executing the Multimedia Messaging Service (MMS).

The display 250 outputs various pieces of display information, including a variety of menu screens, which are output from the mobile terminal 200. The display 250 may include a Liquid Crystal Display (LCD) or Organic Light Emitting Diode (OLED). In the present embodiment, the display 250, under the control of the controller 270, displays multimedia content in a received multimedia message. The multimedia content may include audio content, text content, video content, motion image content, and/or image content.

The input device 260 includes a variety of buttons or keys for inputting numerals and character information, and function buttons for setting a variety of functions. The input device 260 can be implemented using a keypad equipped with direction keys, a jog dial, a touch screen, and a joystick, but is not limited thereto.

For example, the input device 260 receives a request for confirming a multimedia message from a user, and sends the request to the controller 270. The input device 260 receives a play request or a display request from the user for content included in the multimedia message, and sends the request to the controller 270.

Throughout the disclosure of the present invention, the term "reproducing" of the multimedia contents includes playing or displaying multimedia contents. Furthermore, the input device 260 may receive a user's stop play request or a stop display request for a specific content, which is being played or displayed, and sends the request to the controller 270.

In this embodiment, if there is a request received from the input device 260 for confirming a multimedia message, the controller 270 controls a variety of contents included in the multimedia message, such as, whether the message is to be played or displayed on the display 250.

The controller 270 controls the overall operation of the mobile terminal 200, and can alternatively include comprise the data processor 220.

The controller 270 determines time for which content is actually played or displayed, compares the counted time and a predetermined content play time or display time, which is previously set in a Synchronized Multimedia Integrated Language (SMIL) file of a received multimedia message, and determines whether the content has actually been played or displayed for the predetermined content play time or display time set in the SMIL file.

If it is determined that the content has actually been played or displayed for the predetermined content play time or display time set in the SMIL file, then the controller 270 determines that a received side mobile terminal user has confirmed all of the contents.

Furthermore, if it is determined that a user has confirmed all contents included in a multimedia message, according to the above determination reference, then the controller 270 generates a reply message indicating that the user has confirmed all of the contents included in the multimedia message, and sends the reply message to the calling-side mobile terminal that originated the multimedia message.

Further, when the user confirms only a part of the contents of the whole multimedia message and stops play, the controller 270 determines a percentage of the whole multimedia message that was confirmed by the user. Thereafter, the controller 270 generates a reply message including information indicating the percentage of the whole multimedia message that has been confirmed by the received-side mobile terminal user, for example, 50%, and sends the generated reply message to the calling-side mobile terminal that originated the multimedia message.

Accordingly, a calling-side user who has originated the multimedia message can determine whether a received-side party has confirmed all of the contents of the received multimedia message, or a percentage of the whole message that has been confirmed by the received-side party, if only a part of the multimedia message is confirmed.

Figure 3:
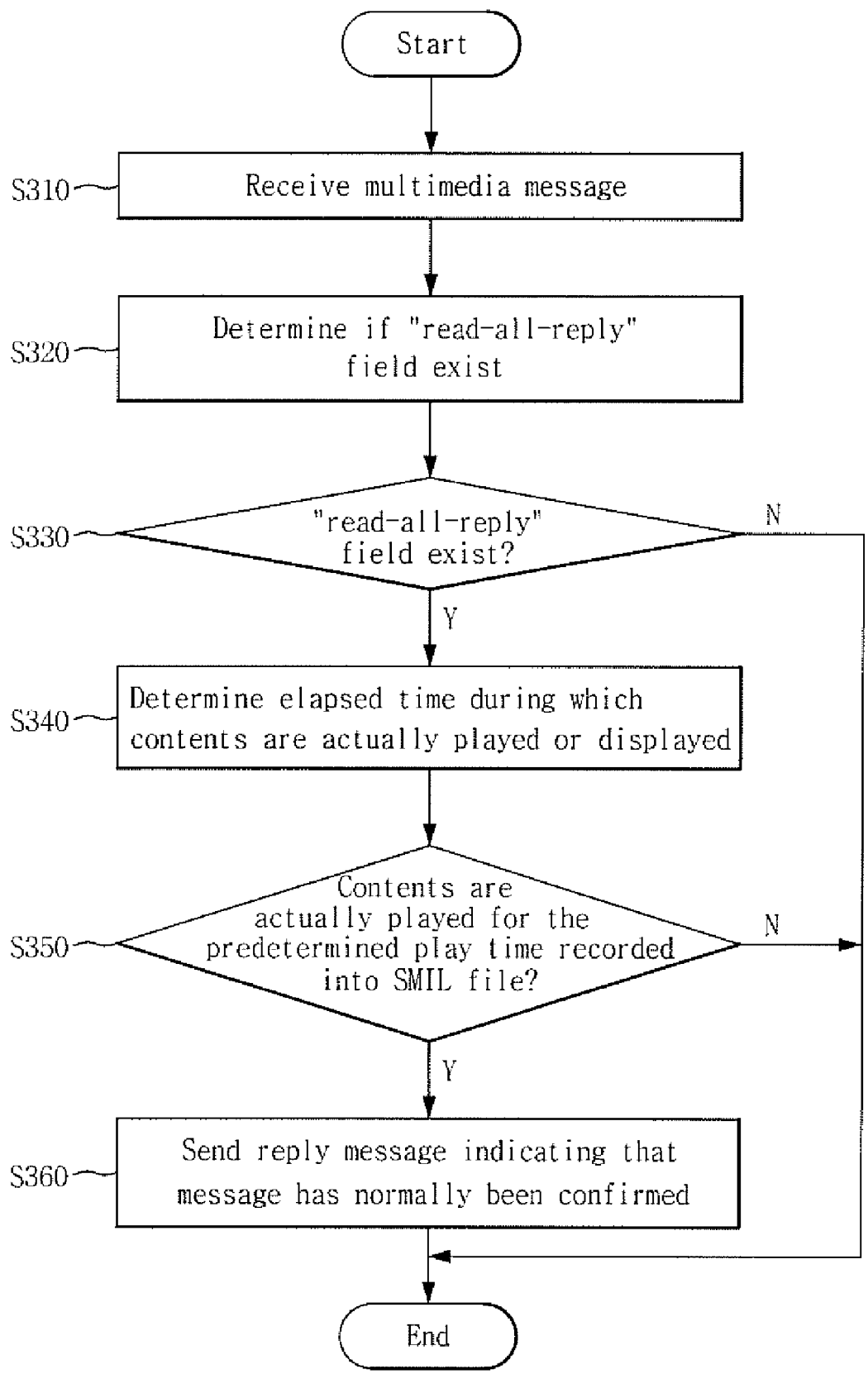
FIG. 3 is a flowchart illustrating a method of acknowledging receipt of the mobile terminal, according to an embodiment of the present invention.

FIG. 3 is a flowchart illustrating a method of acknowledging receipt of a message in a mobile terminal, according to an embodiment of the present invention.

Referring to FIGS. 1 to 3, a multimedia message is received from the MMS center 40 through the wireless transceiver 210 (step S310). The received multimedia message includes information about a total message play time and a play time for each slide, of the multimedia message. The term slide refers to each page constituting a multimedia message. Typically, a multimedia message can include ten slides.

The general format of a multimedia message comprises a header, and a body having actual message data. The header comprises a plurality of fields including information relating to addresses of a calling-side mobile terminal and a received-side mobile terminal, and a message type. The header of the multimedia message further includes a "read-all-reply" field for indicating whether to send a report indicating whether a called party who has received the multimedia message has played or displayed all of the contents of the received multimedia message.

The controller 270 determines whether a "read-all-reply" field exists in a header field of the received multimedia message (step S320).

For example, if the "read-all-replay" field exists in the header field of a received multimedia message (step 330), the controller 270 examines the SMIL file of the multimedia message to confirm a play time for each slide constituting the multimedia message.

The SMIL file describes a particular multimedia presentation for the multimedia contents included in each slide of a multimedia message. The SMIL file is disposed in the body of the multimedia message together with the multimedia contents.

Alternatively, the "read-all-reply" field can be implemented using a "X-Mms-read-Reply" field defined in the existing MMS specification.

In this embodiment, a play time or a display time for each slide of a multimedia message is recorded into the SMIL file of a received multimedia message. When the content consists of an audio, a video, or a motion image, the play time is recorded into the SMIL file. When the content consists of text or an image, the display time is recorded into the SMIL file. The controller 270 determines the elapsed time during which message content is actually played or displayed (step S340).

An example of the SMIL file according to an embodiment of the present invention is as follows.

```
<smile>
  <head>
    <layout>
      <root-layout width="176" height="174"/>
      <region id="text1" backgroundColor="#FFFFFF" width="100%" height="30%" left="0%" top="70%" />
      <region id="img1" backgroundColor="#FFFFFF" width="100%" height="70%" left="0%" top="0%" />
    </layout>
  </head>
  <body>
    <par dur="13s" required-dur="13s">
      <img src="azzurro.jpg" region="img1"/>
      <text src="slide1.txt" region="text1">
```

-continued

```
        <param name="foreground-color" value="#000000"/>
        <param name="textsize" value="normal"/>
      </text>
      <audio src="boom.mp3" />
    </par>
  </body>
</smil>
```

In the above example of the SMIL file, the tag "required-dur", written in a bold font and underlined, is a newly defined tag in one embodiment of the present invention, and indicates a play time or a display time of content.

As described above, after confirming the play time of contents in the SMIL file tag "required-dur" of a received multimedia message, the controller (270) compares the predetermined play time with the elapsed time during which contents included in the multimedia message have actually been played or displayed. Accordingly, it is determined whether the content has actually been played or displayed for the predetermined play time or display time for each slide recorded into the SMIL file (step 350).

If it is determined an actual play time of all of the contents included in each slide of the received multimedia message fulfills the play time set in the tag "required-dur" of the SMIL file, then it is considered that the received-side user has actually confirmed all the contents of the multimedia message.

If it is determined that the received-side user has actually confirmed all the contents, the controller 270 generates a reply message, indicating that the received-side user has normally confirmed all the contents of the received multimedia message, and sends the reply message to the mobile terminal that originated the multimedia message (step S360).

In this case, the header field of the reply message includes a "read-all-status" field, indicating that the received-side user has normally confirmed all the contents of the received multimedia message. The "read-all-status" field is a newly defined field in an embodiment of the present invention.

In the alternative, instead of defining a new field, the "X-Mms-Read-Status" field defined in the existing MMS specification can be used to indicate that the received-side user has normally confirmed all the contents of the received multimedia message.

As described above, according to the embodiment of the present invention, when a called party of a multimedia message has confirmed all the contents included in the multimedia message, a reply message is sent. Accordingly, there is an advantage in that a calling-side user who originated the multimedia message will know whether a received-side user has confirmed all of the multimedia message contents.

For example, an advertiser sending a multimedia message can determine whether general users have read all sent multimedia message advertisings. Accordingly, the advertiser can determine whether advertising employing the multimedia message service is effectively transmitted to users. Accordingly, there is an additional advantage in that a rapid and accurate decision reference in advertising investment can be provided to an advertiser. It is contemplated that this will significantly contribute to the expansion of an advertising market employing the MMS.

Figure 4:
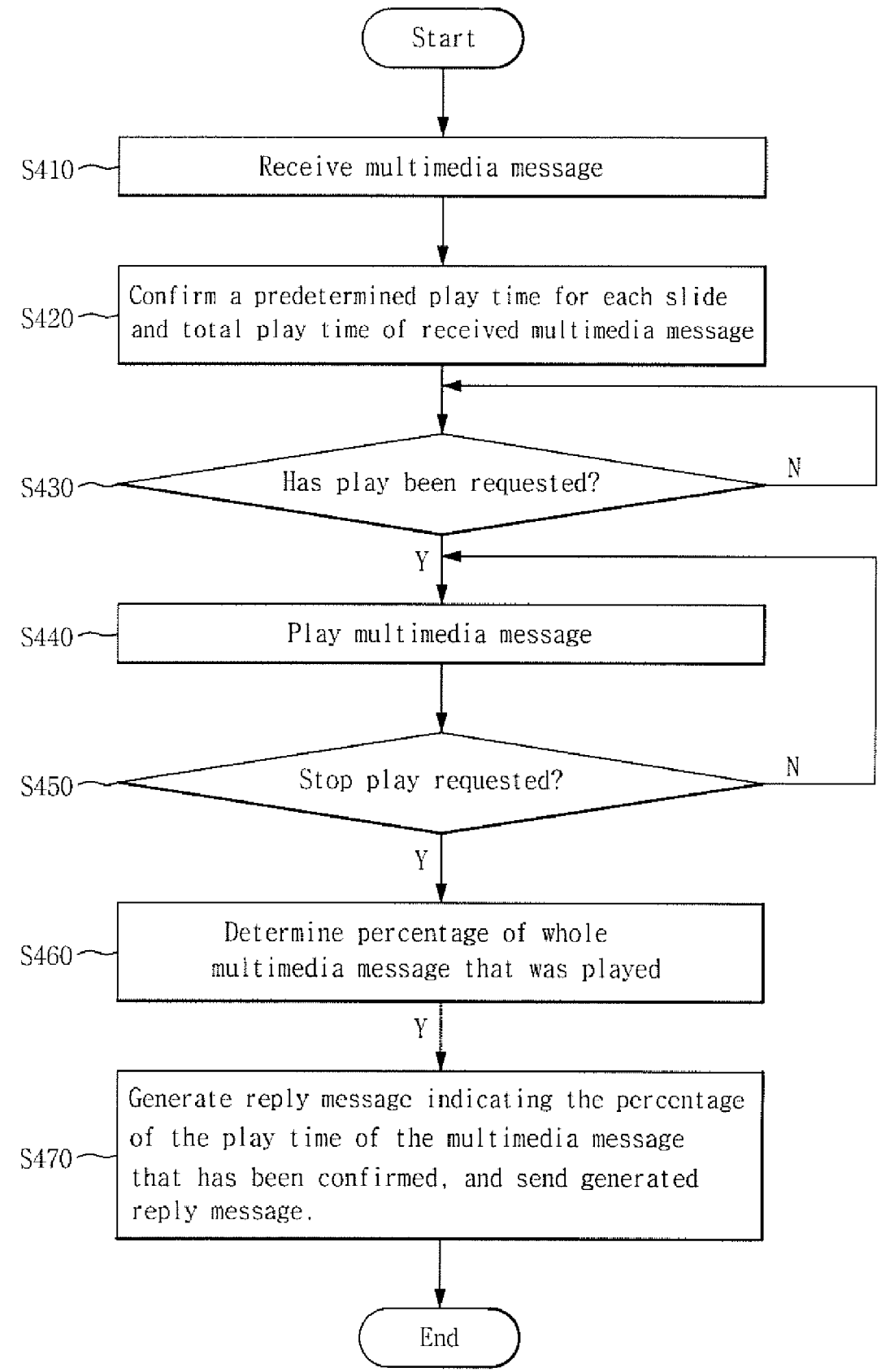
FIG. 4 is a flowchart illustrating a method of acknowledging receipt of a message in a mobile terminal, according to another embodiment of displaying the present invention according to an embodiment of the present invention

FIG. 4 is a flowchart illustrating a method of acknowledging receipt of a message in a mobile terminal, according to another embodiment of the present invention.

Referring to FIG. 4, a multimedia message is first received from the MMS center 40 through the wireless transceiver 210 (step S410). The received multimedia message includes information about a total predetermined play time and a play time for each slide of the multimedia message.

The controller 270 confirms a SMIL file of the received multimedia message, and confirms a predetermined play time for each slide and total play time of the multimedia message (step S420).

The controller 270 determines whether a user has requested the play of the received multimedia message (step 430). If it is determined the user has requested the play of the received multimedia message, the controller 270 plays the contents included in the multimedia message (step S440). While the content is played, the controller 270 controls the display 250 to display a message play progress ratio of the content, which is currently being played, to a total play time of the whole multimedia message.

Figure 5:
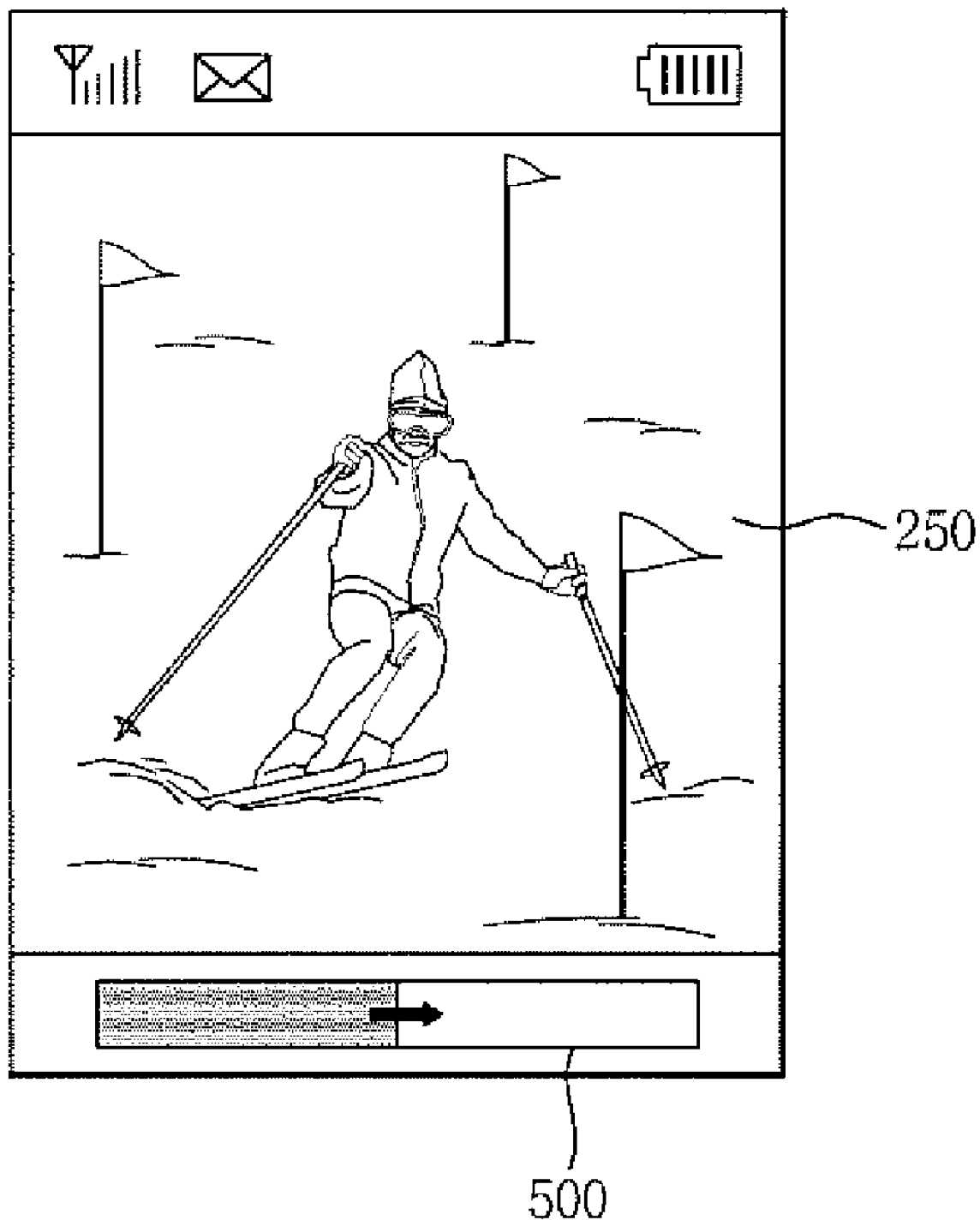
FIG. 5 illustrates an example of displaying a message play progress ratio of content, which is currently being played, to a total play time of the whole multimedia message according to an embodiment of the present invention.

FIG. 5 illustrates an example of displaying the message play progress ratio of content, which is currently being played, to a total message play time of the whole multimedia message displayed. Referring to FIG. 5, a progress bar 500 displays the message progress ratio. Accordingly, a user can determine what amount of the multimedia message has been displayed or played.

If the user stops play of the multimedia message, which is currently being played, through the input device 260, i.e., "Y" in step S450, the controller 270 confirms a total play time of the multimedia message and the elapsed play time of the multimedia message until the play of the multimedia message was stopped by the user, and determines the percentage of the whole multimedia message that has been played by the user (step S460).

For example, it is assumed that the multimedia message includes four slides; the first slide is a text content having the whole play time of 5 seconds, the second slide is an image content having the whole play time of 5 seconds, and the third and fourth slides are a video content respectively have the whole play time of 10 seconds each.

In the case where the user has confirmed all of the first slide and the second slide, and then requests to stop the play of the multimedia message while confirming the video content of the third slide after about 5 seconds, a mathematical equation for calculating the percentage of the whole message that has been confirmed by the user can be expressed as follows.

Ratio (%) of Confirmed Message={Play time from start play to stop of message/Play time of whole message}×100 in the above example, the play time of the whole message is 5+5+10+10=30 seconds, and the play time from start play to stop of the message is 5+5+5=15 seconds. In this case, the message confirmed by the user corresponds to 50% of the whole message.

The controller 270 generates a reply message including information indicating the percentage of the play time of the multimedia message that has been confirmed by the called-side user, for example 50%, and sends the reply message to the calling-side mobile terminal that originated the multimedia message (step S470).

In the above embodiments, the multimedia message has been described by way of examples, but the present invention is not limited thereto.

While the invention has been described in connection with what is presently considered to be practical exemplary embodiments, it is to be understood that the invention is not limited to the disclosed embodiments, but, on the contrary, is intended to cover various modifications and equivalent arrangements comprised within the spirit and scope of the appended claims.

What is claimed is:

1. A method of confirming receipt of a multimedia messaging service (MMS) message in a receiving-side mobile terminal, the method comprising:
   receiving the multimedia message in the receiving-side mobile terminal, wherein the multimedia message is received from an originating mobile terminal;
   reproducing, in the receiving-side mobile terminal, multimedia contents related to the multimedia message; and
   sending, via the receiving-side mobile terminal, a reply message to the originating mobile terminal indicating whether the entire multimedia contents were reproduced,
   wherein the multimedia message comprises reproduction time information used to determine whether the entire multimedia contents were reproduced,
   wherein a plurality of slides forming the multimedia message are reproduced, and
   wherein a reproduction time is defined for each slide forming the multimedia contents wherein determining whether the entire multimedia contents were reproduced comprises:
   determining an elapsed play time of the multimedia contents; and
   comparing the elapsed play time with the reproduction time information.

2. The method of claim 1, wherein sending the reply message comprises indicating a percentage of the entire multimedia contents that were reproduced when reproduction of the multimedia contents is stopped before completion of a predetermined message content play time.

3. The method of claim 1, wherein reproducing the multimedia contents comprises:
   determining whether a multimedia message header comprises a field including instructions to send a reply message indicating that the received multimedia message was reproduced; and
   extracting from a multimedia message data body a file describing a reproduction method for each slide forming the multimedia contents,
   wherein the file comprises the reproduction time information.

4. The method of claim 3, wherein the file is a Synchronized Multimedia Integration Language (SMIL) file.

5. The method of claim 3, wherein the multimedia contents comprise at least text, audio, video, image or moving picture contents.

6. The method of claim 1, wherein the reply message comprises a field indicating whether the multimedia contents were reproduced in accordance with the reproduction time information.

7. A receiving-side mobile terminal for confirming receipt of a multimedia message, the receiving-side mobile terminal comprising:
   a wireless transceiver configured for receiving a multimedia message from an originating mobile terminal;
   an input device configured for receiving input of a reproduction instruction for the multimedia message; and
   a controller configured for reproducing multimedia contents related to the multimedia message based on the reproduction instruction of the input device, generating a reply message indicating whether the entire multimedia contents were reproduced, and sending the reply message through the wireless transceiver to the originating mobile terminal,
   wherein the multimedia message comprises reproduction time information, wherein the controller is further configured for determining whether the entire multimedia contents were reproduced by comparing an elapsed time for reproducing the multimedia contents to the reproduction time information, and wherein the reproduction time information is defined for each of a plurality of slides forming the multimedia contents.

8. The mobile terminal of claim 7, wherein the controller is further configured for generating the reply message comprising information indicating a percentage of the multimedia contents that were reproduced when reproduction of the multimedia contents is stopped before a predetermined reproduction time expires.

9. The mobile terminal of claim 7, further comprising:
a display configured for displaying a reproduction screen of the multimedia contents under the control of the controller when the reproduction instruction is received.

10. The mobile terminal of claim 7, wherein the format of the multimedia message comprises:
a header; and
a body comprising at least the multimedia contents or a file describing a reproducing method for each of the multimedia contents,
wherein the file comprises the reproduction time information.

11. The mobile terminal of claim 10, wherein the file is a Synchronized Multimedia Integration Language (SMIL) file.

12. The mobile terminal of claim 7, wherein the reply message comprises a field for indicating whether the multimedia contents were reproduced in accordance with the reproduction time information.

* * * * *